United States Patent
Aoki et al.

(10) Patent No.: US 8,149,540 B2
(45) Date of Patent: Apr. 3, 2012

(54) MAGNETIC HEAD STRUCTURE WITH DIAGONAL OF RECTANGULAR-SHAPED HEIGHT MONITOR EXTENDING ALONG TRACK WIDTH DIRECTION

(75) Inventors: Daigo Aoki, Niigata-ken (JP); Kenji Honda, Niigata-ken (JP)

(73) Assignee: TDK Corporation, Tokyo (JP)

( * ) Notice: Subject to any disclaimer, the term of this patent is extended or adjusted under 35 U.S.C. 154(b) by 1194 days.

(21) Appl. No.: 11/925,104

(22) Filed: Oct. 26, 2007

(65) Prior Publication Data

US 2008/0106820 A1   May 8, 2008

(30) Foreign Application Priority Data

Nov. 2, 2006   (JP) ................................ 2006-298332

(51) Int. Cl.
*G11B 5/455*   (2006.01)

(52) U.S. Cl. ...................................... 360/128

(58) Field of Classification Search ................. None
See application file for complete search history.

(56) References Cited

U.S. PATENT DOCUMENTS

| | | | | |
|---|---|---|---|---|
| 4,689,877 | A * | 9/1987 | Church | 29/603.1 |
| 6,007,405 | A * | 12/1999 | Mei | 451/5 |
| 6,857,937 | B2 * | 2/2005 | Bajorek | 451/5 |
| 2003/0021069 | A1 * | 1/2003 | Crawforth et al. | 360/234.3 |
| 2003/0026046 | A1 * | 2/2003 | Yamakura et al. | 360/316 |
| 2008/0141522 | A1 * | 6/2008 | Baer et al. | 29/603.12 |

FOREIGN PATENT DOCUMENTS

JP   04-078013   3/1992

* cited by examiner

*Primary Examiner* — Craig A. Renner

(74) *Attorney, Agent, or Firm* — Brinks Hofer Gilson & Lione

(57) ABSTRACT

In a magnetic head structure that forms a medium facing surface of a head element unit by polishing processing, a height monitor that is exposed in the vicinity of the head element unit during the polishing processing to index the height of the head element unit is provided in a planar rectangular shape.

8 Claims, 3 Drawing Sheets

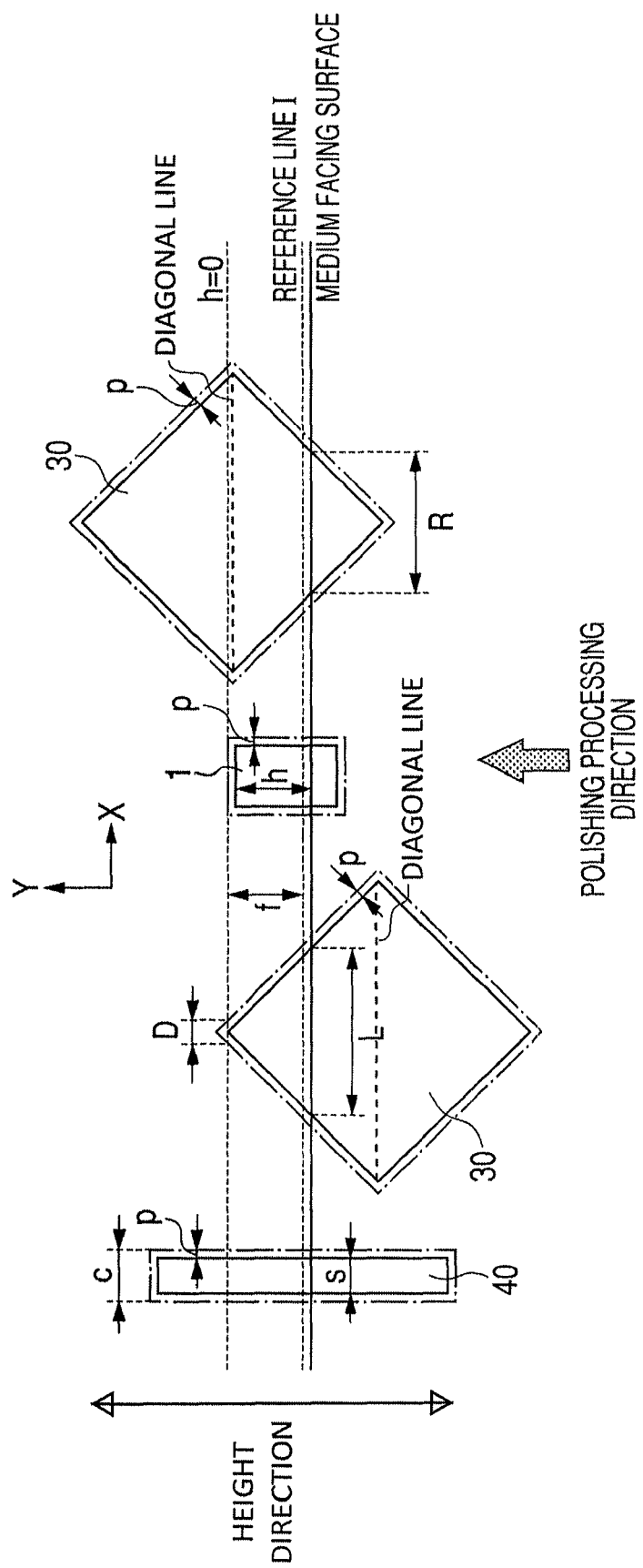

MAGNETIC HEAD STRUCTURE WITH DIAGONAL OF RECTANGULAR-SHAPED HEIGHT MONITOR EXTENDING ALONG TRACK WIDTH DIRECTION

RELATED APPLICATIONS

This application claims the benefit of priority under 35 U.S.C. §119 to Japanese Patent Application No. 2006-298332 filed Nov. 2, 2006, which is hereby incorporated by reference.

BACKGROUND

1. Technical Field

The present invention relates to a magnetic head structure that is obtained by forming a medium facing surface of a head element unit by polishing processing, and its manufacturing method.

2. Description of the Related Art

When a magnetic head is manufactured, generally a bar-like magnetic head substrate, in which a plurality of head element units are arranged in a row or an individual (chip-like) magnetic head in which one head element unit is formed on a wafer, is obtained by arranging head element units, in which at least a reproducing element and a recording element are laminated, in plural rows on one wafer (substrate), then cutting the wafer in individual rows, and forming a surface (medium facing surface) facing a recording medium by polishing processing.

The height of a head element unit is also simultaneously specified by the polishing processing for forming the above medium facing surface. The height of the head element unit is specifically the height of a reproducing element, the gap length of a magnetic gap layer of a recording element if a longitudinal recording method is adopted, and the neck height of a main magnetic pole layer of a recording element if a vertical recording method is adopted. Since these are important factors that contribute to reproducing characteristics or recording characteristic, it is desirable that they are specified correctly.

Thus, in the related art, a method of carrying out the above polishing processing using a height monitor, and detecting the height of the head element unit from the width (dimension in a track width direction) of the height monitor exposed to a polishing processing surface is suggested. One pair of the height monitors is provided on both sides of a head element unit in the track width direction, and are formed in the same process in the same laminating height position as a layer of the head element unit to be monitored, using photolithography. Generally, the pair of height monitors forms a triangular or trapezoidal planar shape, and is arranged in directions (symmetrical shape) opposite to each other in the height direction. The width of the height monitors exposed to the polishing processing surface is infinitesimal with respect to the height of the head element unit, and is measured by a length-measuring SEM (CD-SEM).

However, if one tries to form triangular or trapezoidal height monitors, acute portions cannot be easily exposed by the proximity effect of light during resist exposure. Therefore, corners are rounded, and consequently, the desired shapes cannot be obtained. In the monitors including curved portions as such, the linearity (correlativity) of the width of the monitors exposed to the polishing processing surface and the height of the head element unit is worsened, and it is difficult to detect the height of the head element unit with high precision. In order to avoid this problem, it is conceivable to enlarge the planar shape of the height monitors to use portions excluding the curved portions as the monitors during polishing processing. However, if the planar shape of the height monitor is simply enlarged, the width of the monitors exposed to the polishing processing surface is not converged into the viewing field region of the length-measuring SEM, and consequently, the resolution of SEM cannot help being lowered. If the resolution of SEM is lowered, the measurement precision of the monitor width will decline, and errors in the height of the head element unit calculated on the basis of the monitor width will increase. Consequently, even in this case, it is difficult to detect the height of the head element unit with high precision.

JP-A-4-78013 (Patent Document 1) discloses a detecting marker that is formed in a polygonal shape by cutting away the apexes of a triangle so that acute portions that are easily deformed may not exist in is Patent Document 1. However, the angles of respective corners in such a polygonal shape are different from one another. Therefore, if a pair of monitors is provided on both side of the head element unit, their symmetric property is hardly obtained, and regions that can be effectively used as the monitors may be narrowed.

SUMMARY

The disclosure provides a magnetic head structure including a height monitor that is exposed in the vicinity of a head element unit to index the height of the head element unit during polishing processing that forms a medium facing surface of the head element unit. The height monitor is formed in a planar rectangular shape. The expression "planar rectangular shape" means that the height monitor is formed in a rectangular shape in a plane parallel to the lamination direction of a head element unit, i.e., a plane specified in the track width direction and the height direction.

Preferably, the height monitor is a planar square shape. Since all the corners the planar square shape have equal 90°, the degrees of deformation of the respective corners become uniform, and a symmetric property is obtained when a pair of height monitors are arranged in the positive and negative height directions.

According to an aspect of the disclosed manufacturing method, the pair of height monitors and the absolute value monitor is formed so as to form the following conditional expressions during the polishing processing of forming a medium facing surface of a head element unit.

$$p=(c-S)/2$$

$$h=(L-D-2\times(1-2^{1/2})\times p)/2$$

where h: the height of the head element unit obtained by the polishing processing,
L: the width of one height monitor exposed to the medium facing surface by the polishing processing,
c: a width reference value of the absolute value monitor,
S: the width of the absolute value monitor exposed to the medium facing surface by the polishing processing,
p: the increase/reduction amount from the reference value after the polishing processing, and
D: the width reference value of the height monitor at h=0.

According to a second aspect of the disclosed manufacturing method, the pair of height monitors and the absolute value monitor is formed so as to form the following conditional expressions during the polishing processing of forming a medium facing surface of a head element unit.

$$p=(c-S)/2$$

$$h=(L-R)/4+f-p$$

where h: the height of the head element unit obtained by the polishing processing, L: the width of one height monitor exposed to the medium facing surface by the polishing processing, R: the width of the other height monitor exposed to the medium facing surface by the polishing processing, f: the height-direction length from h=0 to the reference line, c: a width reference value of the absolute value monitor, S: the width of the absolute value monitor exposed to the medium facing surface by the polishing processing, and p: the increase/reduction amount from the reference value after the polishing processing.

If the height monitors and absolute value monitor that are formed in the first and second aspects are used, the absolute value of the height of the head element unit can be detected easily.

According to the invention, it is possible to obtain a magnetic head structure and its manufacturing method capable of detecting the height of a head element unit with high precision, during the polishing processing for forming a recording medium facing surface.

BRIEF DESCRIPTION OF THE DRAWINGS

FIG. 5 is a schematic plan view illustrating how to detect the height of the head element unit, using the measurement value of the width of both of a pair of height monitors exposed to the polishing processing surface, and the measurement value of the width of an absolute value monitor.

DESCRIPTION OF THE EMBODIMENTS

Figure 1:
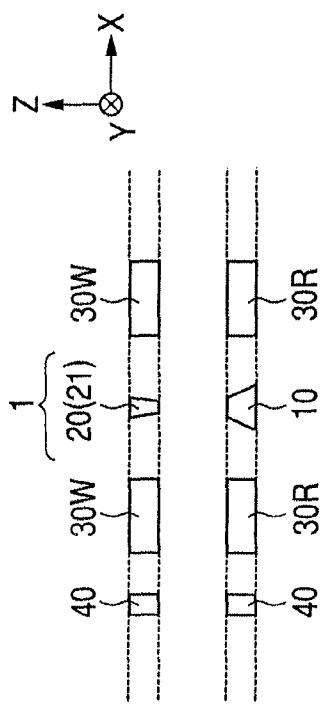
FIG. 1 is a sectional view when principal elements of a magnetic head structure to which the invention is applied are viewed from a medium facing surface.

Hereinafter, the embodiments of the invention will be described with reference to the drawings. The X direction, Y direction, and Z direction in the drawings are respectively defined as a track width direction, a height direction (element height direction), and a lamination direction of individual layers that constitute a magnetic head structure.

FIG. 1 is a sectional view when principal elements of a magnetic head structure (finished state) to which the invention is applied are viewed from a medium facing surface. A bar-like magnetic head substrate in which a plurality of head element units are arranged in one row on a wafer, and an individual (chip-like) magnetic head in which one head element unit is formed on a wafer are generically called the magnetic head structure.

This magnetic head structure includes, on a substrate, a head element unit 1 that is constituted by a reproducing element 10 that reads the magnetic recording information of a recording medium using a magnetoresistive effect, and a recording element 20 that gives a recording magnetic field to the recording medium, thereby performing recording operation. The reproducing element 10 is a magnetoresistive effect element, such as AMR, GMR, or TMR, and is formed in a gap insulating layer that fills a space between a lower shielding layer and an upper shielding layer.

The recording element 20 is a vertical magnetic recording type recording element laminated on the upper shielding layer via an insulating layer. This recording element has a main magnetic pole layer 21 that applies a recording magnetic field vertical to a recording medium, an auxiliary magnetic pole layer (return path layer) that receives the recording magnetic field returned through the recording medium, a magnetic gap layer that is interposed between the ends of the main magnetic pole layer 21 and the auxiliary magnetic pole layer that become the medium facing surfaces, and a recording coil that is located between the main magnetic pole layer 21 and the auxiliary magnetic pole layer to give a recording magnetic field to the main magnetic pole layer 21. The main magnetic pole layer 21 has a pole straight portion, a flare portion, and a base portion sequentially from its medium facing surface. In the pole straight portion, the dimension in the track width direction is set to a predetermined track width, and the dimension in the height direction is set to be larger than a predetermined neck height, and is specified to a predetermined neck height by the polishing processing to be described later. This neck height (dimension of the pole straight portion in the height direction) is the height of the main magnetic pole layer 21. The flare portion is a region for allowing a recording magnetic field to be narrowed towards the pole straight portion from the base portion. In this flare portion, the dimension in the track width direction increases towards the deep side in the height direction from the pole straight portion.

The magnetic head structure having the above configuration is formed by arranging head element units 1 in plural rows on one wafer, then cutting the wafer in individual rows to split the wafer into chips or bars, and polishing one end surface of the split magnetic head structure that becomes a medium facing surface, thereby specifying the height (specifically, the height of the reproducing element 10 and the neck height of the main magnetic pole layer 21) of each of the head element units 1.

This magnetic head structure includes, as monitors for detecting the height of a head element unit 1 during the polishing processing for forming a medium facing surface, one pair of reproducing-side height monitors 30R that are formed under the same conditions in the same laminating position as the reproducing element 10. These reproducing-side height monitors 30R are exposed in the vicinity of the reproducing element 10 in the medium facing surface. The magnetic head structure also includes one pair of recording-side height monitors 30W that are formed under the same conditions in the same laminating position as the main magnetic pole layer 21 of the recording element 20, and are exposed in the vicinity of the main magnetic pole layer 21 in the medium facing surface. Also included are absolute value monitors 40 that are formed under the same conditions in the same laminating positions as the reproducing-side height monitors 30R and the recording-side height monitors 30W, and are exposed in the vicinity of the reproducing-side height monitors 30R and the recording-side height monitors 30W, respectively.

Figure 2:
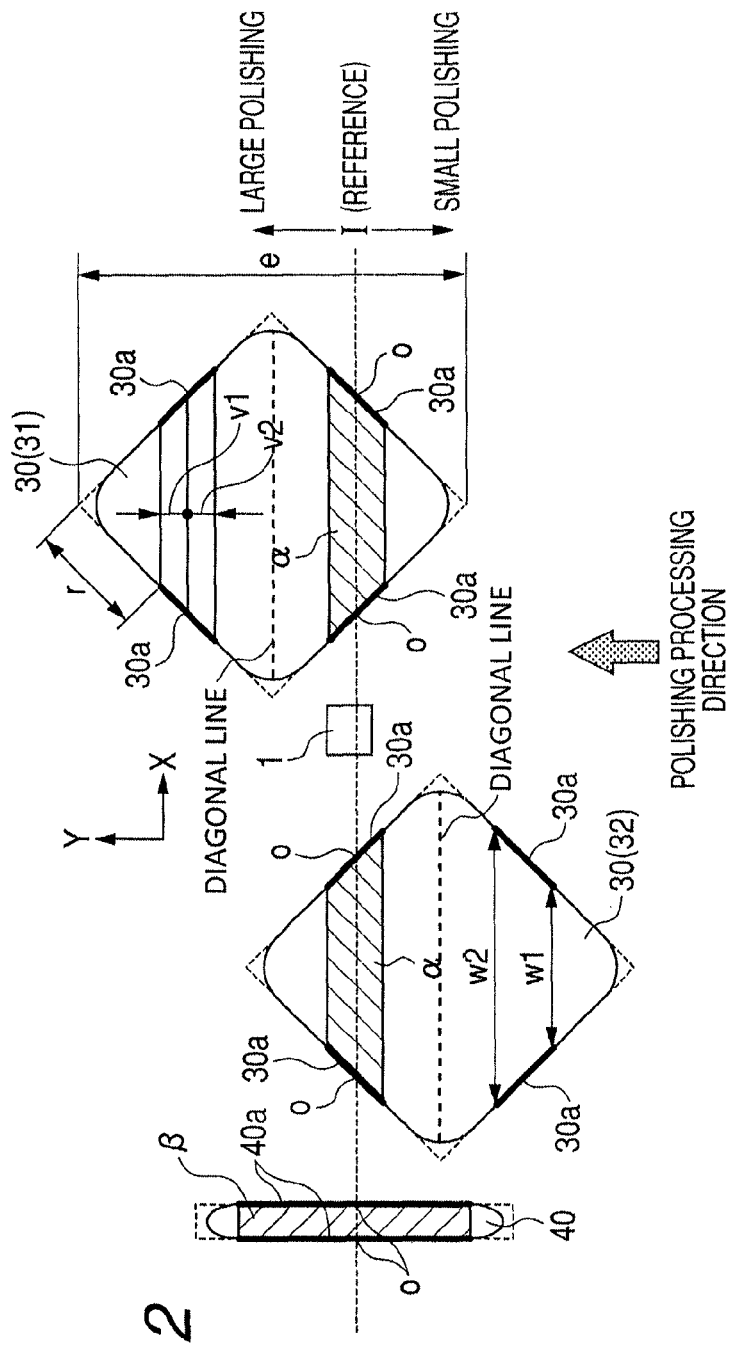
FIG. 2 is a schematic plan view showing height monitors, an absolute value monitor, and a head element unit before polishing processing.

FIG. 2 is a schematic plan view showing height monitors 30, an absolute value monitor 40, and a head element unit 1 (a reproducing element 10 and a main magnetic pole layer 21) before polishing processing. Since the reproducing-side height monitors 30R and recording-side height monitors 30W of FIG. 1 are formed in the same shape, and are arranged similarly to the head element unit 1 (the reproducing element 10 and the main magnetic pole layer 21), they will be described below as simple height monitors 30 without distinction of the reproducing-side and recording-side monitors.

A pair of height monitors 30 form a planar square shape in the illustrated XY plane, and are arranged in a positional relationship that is symmetric with respect to a reference line I for polishing processing (imaginary line) on both sides of the head element unit 1 in the track width direction in a state where two facing sides of the square shape have been rotated by 45 degrees in the track width direction. Since the height monitors 30 that form a planar square shape are formed using photolithography, although they are designed in the square shape shown by broken lines of FIG. 2, roundness actually occurs at the corners of the square shape by the proximity effect of light during exposure. Since all angles of the square shape in a design stage are 90 degrees, the degrees of roundness of corners that occur by exposure are uniform. A region excluding the corners, i.e., a region that is obtained by connecting a pair of straight portions 30a that are at individual sides of the square shape and adjacent to each other in the track width direction is used as an effective monitor region α. The effective monitor region α is hatched in FIG. 2. In the effective monitor region α formed by the straight portions 30a, the linearity of the width of a monitor exposed to the polishing processing surface and the linearity of the height of the head element unit can be kept high.

In the pair of height monitors 30, a straight line that connect the midpoints O of the pair of straight portions 30a that define the effective monitor region α are the above reference line I. In each height monitor 30, the height of the head element unit 1 when polishing has been made up to the reference line I is set to a reference-value of zero, and the amount of deviation with respect to the reference line I is indexed by a dimension in the track width direction of the monitor exposed to the polishing processing surface. Specifically, the dimension in the track width direction of the pair of height monitors 30 exposed to the polishing processing surface (surface parallel to a surface that becomes a medium facing surface) becomes equal at the reference line I. As a result, the dimension from the reference line I increase in any one of the positive and negative height directions, and decreases in the other direction. Based on the reference line I that is obtained by connecting the midpoints O of the effective monitor region α, an effective monitor region can be secured by the same width in any one of the positive and negative height directions.

In the pair of height monitors 30 of the present embodiment, when one end surface that becomes the medium facing surface of the head element unit 1 is polished towards the deep side in the height direction (thick arrow direction of FIG. 2), the reference line I indicates the proper position of the height of the head element unit 1. Also, when the dimension in the track width direction of a monitor exposed to the polishing processing surface is larger at a height monitor 32 shown on the left than at a height monitor 31 shown on the right, it indicates that the height of the head element unit 1 is low (greater than a proper dimension, and polishing quantity is small). When the dimension in the track width direction of a monitor exposed to the polishing processing surface is smaller at the left height monitor 31 than at the right height monitor 32, it indicates that the height of the head element unit 1 is high (smaller than a proper dimension, and polishing quantity is large).

Figure 3:
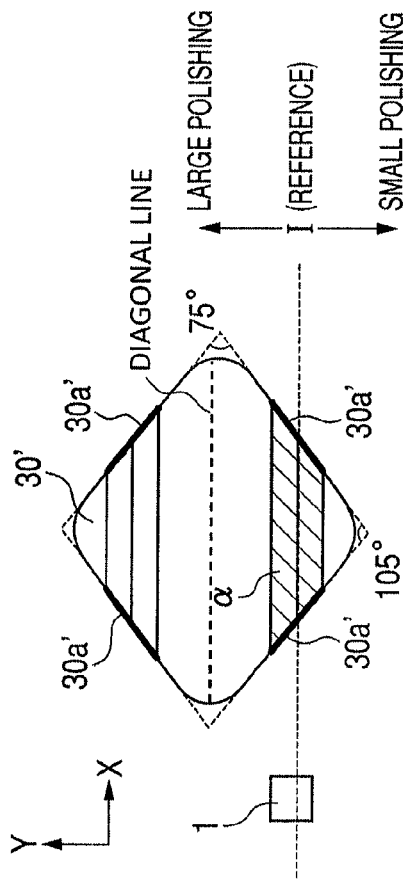
FIG. 3 is a plan view showing another aspect of the height monitor

The shape of the pair of height monitors 30 is not limited to a planar square shape, and may be a planar rectangular shape consisting of opposite angles of 105°, and opposite angles of 75°, for example, as shown in FIG. 3. If the angle of the planar rectangular shape is set to about 90±15 degrees, an effective monitor region a consisting of straight portions 30a' can be sufficiently secured even by a pair of height monitors 30' that form a planar rectangular shape. The effective monitor region α is also hatched in FIG. 3.

The absolute value monitor 40 indexes the absolute value of the height of the head element unit 1 by the dimension in the track width direction of a monitor exposed to the polishing processing surface, using the a pair of height monitors 30 together. This absolute value monitor 40 forms an elongate planar oblong shape in the height direction in the illustrated XY plane, and is arranged adjacent to one height monitor (shown on the right in the present embodiment) 30 in a state where facing sides of the planar oblong shape is parallel to or orthogonal to the track width direction. Since the absolute value monitor 40 is also formed using photolithography, although it is designed in an oblong shape shown by broken lines of FIG. 2, roundness actually occurs at the corners of the oblong shape by the proximity effect of light during exposure. Since all angles of the oblong shape in a design stage are 90 degrees that are equal to each other, the degrees of roundness of corners that occur by exposure are uniform. A region excluding the corners, i.e., a region that is obtained by connecting a pair of straight portions 40a of the oblong shape, which extend in the height direction, in the track width direction is used as an effective monitor region β. The effective monitor region β is also hatched in FIG. 2. The absolute value monitor 40 is arranged by locating the midpoints O of the pair of straight portions 40a on the above reference line I, and secures the effective monitor region β by the same width in any one of the positive and negative height directions.

In the present embodiment, a height monitor 30 is formed with a necessary minimum dimension so that the measurement precision of the dimension of the monitor exposed to the polishing processing surface may be improved. When the length of a line that connects opposite corners of a height monitor 30 is "e", the length from an end of a straight portion 30a in a design stage to a corner is "r", the height-direction lengths from the reference line I to lower and upper limits of an effective monitor region α are "v1" and "v2", and the maximum and minimum lengths of the dimensions in the track width direction of the height monitor 30 exposed to a polishing processing surface are "w1" and "w2", the following equations (1) to (3) is satisfied.

$$e = 2 \times (2 \times (r/(2)^{1/2}) + v1 + v2) \quad (1)$$

$$w1 = 2 \times (r/(2)^{1/2}) \quad (2)$$

$$w2 = 2 \times (r/(2)^{1/2}) + v1 + v2) \quad (3)$$

Here, since the reference line I is located on the midpoints of the effective monitor region α, the height-direction lengths v1 and v2 from the reference line I to the lower and upper limits of the effective monitor region α become equal. If the following relationship v1=v2=v is satisfied, the above equations (1) to (3) can be expressed by the following equations (4) to (6).

$$e = 4 \times (r/(2)^{1/2}) + v) \quad (4)$$

$$w1 = 2 \times (r/(2)^{1/2}) \quad (5)$$

$$w2 = 2 \times (r/(2)^{1/2}) + (2 \times v)) \quad (6)$$

It is desirable to form the height monitor 30 with a necessary minimum dimension on the basis of these equations (4) to (6).

Moreover, in the present embodiment, the height monitor 30 and the absolute value monitor 40 are formed in the following first or second aspect so that the actual height of an head element unit 1 can be detected from actual measurement values of the widths of the height monitors 30 and absolute value monitor 40 exposed to the medium facing surface by polishing processing.

Figure 4:
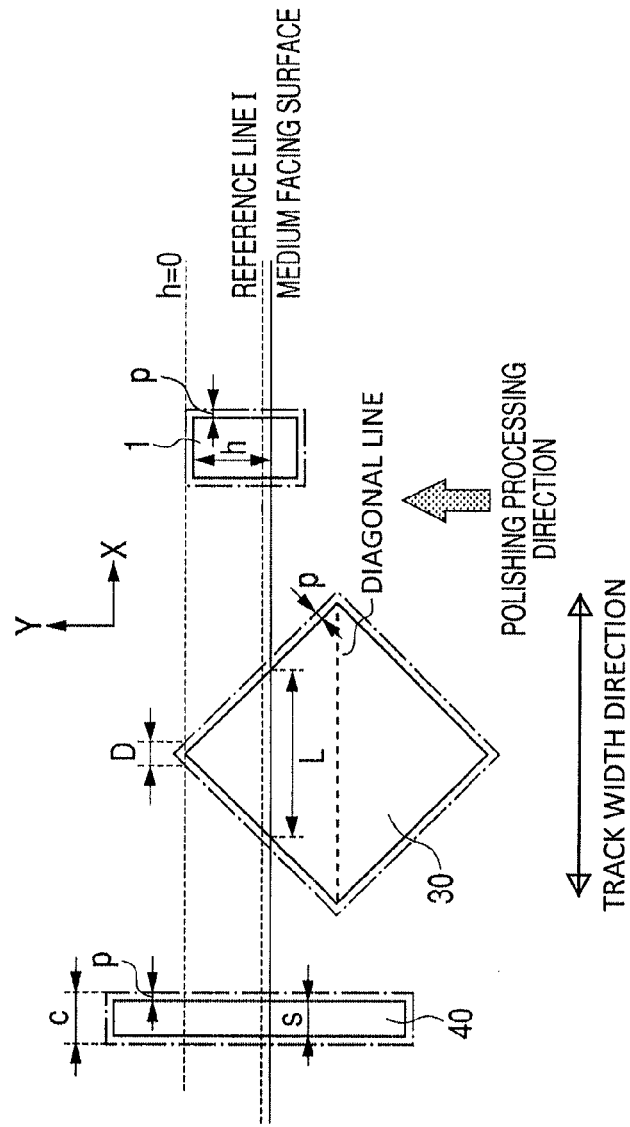
FIG. 4 is a schematic plan view illustrating how to detect the height of the head element unit, using the measurement value of the width of any one of a pair of height monitors exposed to a polishing processing surface, and the measurement value of the width of an absolute value monitor.

In the first aspect, as shown in FIG. 4, if the actual height of the head element unit 1 obtained by polishing processing is "h", the width (actual measurement value) of one height monitor 30 exposed to a medium facing surface by polishing processing is "L", the width reference value (width in a design stage) of the absolute value monitor 40 is "c", the width (actual measurement value) of the absolute value monitor 40 exposed to the medium facing surface by the polishing processing is "S", the increase/reduction amount from a reference value (width in a design stage) after the polishing processing is "p", and the width reference value (width in a design stage) of the height monitor 30 at h=0 is "D", the height monitors 30 and the absolute value monitor 40 are formed so that the following conditional expressions (7) and (8) may be satisfied.

$$p=(c-S)/2 \quad (7)$$

$$h=(L-D-2\times(1-2^{1/2})\times p)/2 \quad (8)$$

According to this first aspect, the actual height h of the head element unit 1 can be easily detected from the measurement value, and the conditional expressions (7) and (8) by measuring the width L of any one of a pair of height monitors 30 exposed to the medium facing surface, and the width S of the absolute value monitor 40.

In the second aspect, as shown in FIG. 5, if the actual height of the head element unit 1 obtained by polishing processing is "h", the width (actual measurement value) of one height monitor 30 exposed to a medium facing surface by polishing processing is "L", the width (actual measurement value) of the other height monitor 30 exposed to the medium facing surface by polishing processing is "R", the height-direction length from h=0 to the reference line I is "f", the width reference value (width in a design stage) of the absolute value monitor 40 is "c", the width (actual measurement value) of the absolute value monitor 40 exposed to the medium facing surface by the polishing processing is "S", and the increase/reduction amount from a reference value (width in a design stage) after the polishing processing is "p", the height monitors 30 and the absolute value monitor 40 are formed so that the following conditional equations (7) and (9) may be satisfied.

$$p=(c-S)/2 \quad (7)$$

$$h=(L-R)/4+f-p \quad (9)$$

According to this second aspect, the actual height h of the head element unit 1 can be easily detected from the measurement value, and the conditional expressions (7) and (9) by measuring both the widths R and L of a pair of height monitors 30 exposed to the medium facing surface, and the width S of the absolute value monitor 40. As for the pair of height monitors 30 of the present embodiment, in the conditional expression (9), (L−R)=0 indicates a proper position of the height of the head element unit 1, (L−R)>0 indicates that the height of the head element unit 1 is low (larger than a proper dimension, or polishing quantity is small), and (L−R)<0 indicates that the height of the head element unit 1 is high (smaller than a proper dimension, or polishing quantity is large).

The above height monitor 30 and absolute value monitor 40 can be formed from, for example, any one of Au, Ta, Cr, Ti, NiFe, CoFe, CrTi, NiFeCr, Ru, CoFeB, Co, Cu, IrMn, and PtMn, or a laminated film thereof.

If the polishing processing for forming a medium facing surface is started, a pair of height monitors 30 are exposed to the polishing processing surface in both positions with the head element unit 1 therebetween, and the absolute value monitor 40 is exposed next to one height monitor 31. The width of the height monitors 30 exposed to the polishing processing surface and the width of the absolute value monitor 40 are measured by a length-measuring SEM (CD-SEM). At this time, it can generally be understood that the height of the head element unit 1 is proper (the amount of deviation with respect to the reference line I is zero (0)) if the widths of the pair of height monitors 30 are equal to each other, and the height of the head element unit 1 is not proper (the height is low or high) if any one of the widths of the pair of height monitors 30 is larger or smaller. More specifically, the height of the head element unit 1 can be detected (calculated) on the basis of the measured widths of the height monitors 30 and absolute value monitor 40, the above-mentioned conditional expressions (7) and (8) or (7) and (9).

As described above, in the present embodiment, the height monitors 30 are provided in a planar square shape (planar rectangular shape). Thus, any deformation (roundness) caused at the corners of the planar square shape can be suppressed as compared with the case where the height monitors are provided in a planar shape having acute angles like, for example, a triangular shape or a trapezoidal shape. Further, since the degrees of deformation of the corners are uniform, a symmetric property is obtained if a pair of monitors is arranged in positive and negative height directions. As a result, the effective monitor region a consisting of only straight portions that are not deformed can be secured widely. If this effective monitor region α is used, the linearity the width of a monitor exposed to a polishing processing surface and the linearity of the height of the head element unit 1 can be kept high, and the height of the head element unit 1 can be detected with high precision. Consequently, it is not necessary to enlarge the planar shape of the height monitors 30 in order to secure the linearity of the width of a monitor exposed to the polishing processing surface, and the linearity of a height of the head element unit 1. The width of the monitor can be detected while the resolution of a length-measuring SEM is kept high, i.e., the width of the monitor can be detected with high precision. This also allows the height of the head element unit 1 to be detected with high precision. Further, in the present embodiment, the absolute value monitors 40 are provided along with the height monitor 30. Thus, the absolute value of the height of the head element unit 1 can be detected easily.

In the present embodiment, a pair of height monitors 30, and a pair of absolute value monitors 40 are provided on both the reproducing side and recording side. However, they may be provided on any one side. Further, although a pair of height monitors 30 is provided, it is natural that a single height monitor may be provided, or one height monitor 30 and one absolute value monitor 40 may be provided.

The invention claimed is:

1. A magnetic head structure comprising at least one height monitor that is exposed in the vicinity of a head element unit to index the height of the head element unit during polishing processing that forms a medium facing surface of the head element unit,
    wherein the height monitor is formed in a planar rectangular shape in a cross section parallel both to a height direction of the head element and to a track width direction of the head element, and
    wherein a diagonal line of the planar rectangular shape extends along the track width direction.

2. The magnetic head structure according to claim 1,
    wherein the height monitor is formed in a planar square shape.

3. The magnetic head structure according to claim 1,
    wherein the height monitor has straight portions at individual sides of the rectangular shape, and indexes the height position of the head element unit in an effective monitor region defined by connecting a pair of the straight portions that are adjacent to each other in the track width direction.

4. The magnetic head structure according to claim 3,
    wherein the height monitor adopts as a reference line a line obtained by connecting the midpoints of a pair of straight portions that define the effective monitor region, and indexes the height position of the head element unit by the amount of deviation with respect to the reference line.

5. The magnetic head structure according to claim 4,
wherein the at least one height monitor comprises one pair of height monitors that are provided on both sides of the head element unit in the track width direction, the reference line is located on the same straight line, and the pair of height monitors are arranged such that the reference line of one of the pair of height monitors is positioned below the diagonal line of one of the pair of height monitors in a height direction and such that the reference line of the other of the pair of height monitors is positioned above the diagonal line of the other of the pair of height monitors in a height direction.

6. The magnetic head structure according to claim 4,
further comprising an absolute value monitor that is exposed in the vicinity of the height monitor during the polishing processing to index the absolute value of the height of the head element unit, and the absolute value monitor is formed in a planar oblong shape, and is arranged by locating the midpoints of a pair of straight portions extending in the height direction of the oblong shape on the reference line.

7. A method of manufacturing the magnetic head structure according to claim 6,
wherein the height monitor and the absolute value monitor are formed so as to form the following conditional expressions during the polishing processing of forming the medium facing surface of the head element unit:

$p=(c-S)/2$ $h=(L-D-2\times(1-2^{1/2})\times p)/2$ where
h: the height of the head element unit obtained by the polishing processing,
L: the width of the height monitor exposed to the medium facing surface by the polishing processing,
c: a width reference value of the absolute value monitor,
S: the width of the absolute value monitor exposed to the medium facing surface by the polishing processing,
p: the increase/reduction amount from the reference value after the polishing processing, and
D: the width reference value of the height monitor at $h=0$.

8. A method of manufacturing the magnetic head structure according to claim 6,
wherein the at least one height monitor comprises a pair of height monitors, the pair of height monitors and the absolute value monitor are formed so as to form the following conditional expressions during the polishing processing of forming the medium facing surface of the head element unit:

$p=(c-S)/2$ $h=(L-R)/4+f-p$ where
h: the height of the head element unit obtained by the polishing processing,
L: the width of one of the pair of height monitors exposed to the medium facing surface by the polishing processing,
R: the width of the other of the pair of height monitors exposed to the medium facing surface by the polishing processing,
f: the height-direction length from $h=0$ to the reference line,
c: a width reference value of the absolute value monitor,
S: the width of the absolute value monitor exposed to the medium facing surface by the polishing processing, and
p: the increase/reduction amount from the reference value after the polishing processing.

* * * * *